US007495818B2

(12) United States Patent
Ogikubo et al.

(10) Patent No.: US 7,495,818 B2
(45) Date of Patent: Feb. 24, 2009

(54) MICROELECTROMECHANICAL DEVICE ARRAY AND METHOD FOR DRIVING THE SAME

(75) Inventors: Shinya Ogikubo, Kanagawa (JP); Hirochika Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 43 days.

(21) Appl. No.: 11/449,618

(22) Filed: Jun. 9, 2006

(65) Prior Publication Data

US 2006/0279496 A1 Dec. 14, 2006

(30) Foreign Application Priority Data

Jun. 9, 2005 (JP) ........................ P. 2005-169868

(51) Int. Cl.
*G02B 26/00* (2006.01)
*G02B 26/08* (2006.01)
*G02F 1/29* (2006.01)

(52) U.S. Cl. ....................... 359/291; 359/292; 359/295; 359/298

(58) Field of Classification Search ................. 359/291, 359/290, 292, 295, 212, 214, 849, 848
See application file for complete search history.

(56) References Cited

U.S. PATENT DOCUMENTS

2005/0219676 A1* 10/2005 Kimura et al. .............. 359/238

FOREIGN PATENT DOCUMENTS

JP 10-48543 A 2/1998

* cited by examiner

*Primary Examiner*—Ricky L Mack
*Assistant Examiner*—Brandi N Thomas
(74) *Attorney, Agent, or Firm*—Sughrue Mion, PLLC

(57) ABSTRACT

In a microelectromechanical device array including an array of devices arranged at least one of one-dimensionally and two-dimensionally each of which includes a movable portion that is supported to be elastically deformed and that has a movable electrode on at least one part thereof and fixed electrodes that are disposed to face the movable portion and by which the movable portion is moved to one of at least two different positions, hold electrodes are disposed beside the fixed electrodes, and a hold voltage is applied to the hold electrodes and before rewriting an address voltage that is applied to the fixed electrodes so as to fix the position state of the movable portion.

11 Claims, 5 Drawing Sheets

MICROELECTROMECHANICAL DEVICE ARRAY AND METHOD FOR DRIVING THE SAME

BACKGROUND OF THE INVENTION

1. Field of the Invention

The invention relates to a microelectromechanical device array and a method for driving the microelectromechanical device array at a high speed.

2. Background Art

JP-A-10-48543 (the term "JP-A" as used herein means an "unexamined published Japanese patent application) discloses a conventional method for driving a microelectromechanical device array, such as a DMD (Digital Micro-mirror Device). This conventional driving method will be described with reference to FIGS. 3 to 5.

FIG. 3 is a schematic drawing that illustrating two of an array of microelectromechanical devices that constitute a microelectromechanical device array. A semiconductor substrate 1 contains a drive circuit, not shown, therein, and has movable mirrors 2 and 3 disposed on the surface thereof.

Each of the movable mirrors 2 and 3 is supported in a space by a hinge 6 extended between supporting rods 4 and 5 erected on the surface of the semiconductor substrate 1, and can swing right and left upon the hinge 6. Movable electrode films 7 and 8 are formed integrally with the hinge 6 at the right and the left of the hinge 6 placed therebetween, respectively. Fixed electrode films 9 and 10 are formed on the surface of the semiconductor substrate 1 at positions facing the movable electrode films 7 and 8, respectively.

A bias voltage Vb of 24V (Vb=24V) is applied to the hinge 6 (i.e., the electrode films 7 and 8) of the movable mirror 2 as a control voltage. An address voltage Va of 5V (Va=5) is applied to the fixed electrode film 9 as a displacement signal, and an address voltage Va of 0V (Va=0) is applied to the fixed electrode film 10 as a displacement signal. As a result, a voltage difference DV of 19V (DV=19) is caused between the electrode films 7 and 9, and a voltage difference DV of 24V (DV=24V) is caused between the electrode films 8 and 10. Therefore, the movable mirror 2 is tilted in a direction in which the electrode films 8 and 10 come into contact with each other by a difference between an electrostatic force generated between the electrode films 7 and 9 and an electrostatic force generated between the electrode films 8 and 10. FIG. 3 illustrates a state in which the movable mirror 2 is tilted by −10°.

Likewise, a bias voltage Vb of 24V (Vb=24V) is applied to the hinge 6 (i.e., the electrode films 7 and 8) of the movable mirror 3. An address voltage Va of 0V (Va=0) is applied to the fixed electrode film 9, and an address voltage Va of 5V (Va=5) is applied to the fixed electrode film 10. As a result, a voltage difference DV of 24V (DV=24) is caused between the electrode films 7 and 9, and a voltage difference DV of 19V (DV=19V) is caused between the electrode films 8 and 10. Therefore, the movable mirror 3 is tilted in a direction in which the electrode films 7 and 9 come into contact with each other by a difference between an electrostatic force generated between the electrode films 7 and 9 and an electrostatic force generated between the electrode films 8 and 10. FIG. 3 illustrates a state in which the movable mirror 3 is tilted by +10°.

When an incident light is projected onto the movable mirrors 2 and 3, light that has impinged thereon is reflected therefrom in various directions depending on the tilt of the movable mirrors 2 and 3. Therefore, the direction of the reflected light can be on-off-controlled by controlling the tilt of the movable mirrors 2 and 3.

However, it is difficult to tilt the movable mirror, which has been already tilted, in an opposite direction, and hence a conventional method has been employed in which the movable mirror is controllably driven while performing complex voltage control. This will be described with reference to FIG. 4 and FIG. 5.

The tilted movable mirror 2 is illustrated at the uppermost part of FIG. 4. If the movable mirror that has been tilted toward left side is brought into a next state, two cases can be mentioned as the "next state". The two cases are a case in which the movable mirror is tilted toward the opposite side (right side) and a case in which the movable mirror is tilted toward the same side (left side), i.e., the tilted state is kept unchanged. If this microelectromechanical device array is used in an image forming apparatus, the state to be reached depends on data about an image to be formed.

The left in each frame illustrated at the lower part of FIG. 4 illustrates a case in which the movable mirror 2 is displaced toward the opposite side (i.e., crossover transition), whereas the right therein illustrates a case in which the tilted state of the movable mirror 2 is maintained (i.e., stay transition). Address voltages Va applied to the fixed electrode films 9 and 10 of each of the movable mirrors 2 and 3 are controlled individually in the movable mirrors 2 and 3, whereas a common bias voltage Vb is applied to all of the movable mirrors.

When the tilted state of the movable mirror is changed to the next state, the bias voltage Vb is changed as illustrated in FIG. 5. Let the period from the start of the change of the movable mirror to the end thereof be divided into zone A, zone B, zone C, zone D, and zone E. First, the bias voltage Vb is set at 24V (Vb=24V) in zone A, and the bias voltage Vb is set at 26V (Vb=26V) in zone B. Further, the bias voltage Vb is set at 7.5V (Vb=7.5V) in zone C following zone B, and the bias voltage Vb is returned to 24V (Vb=24V) in zone D. The bias voltage Vb is kept at 24V (Vb=24V) in zone E.

In zone A, the address voltage Va (0V or 5V) is rewritten. When the movable mirror is changed to the next state, the movable electrode films 7 and 8 moved together with the movable mirror are brought close to the fixed electrode film 9. When the movable mirror is intended to be tilted, the voltage Va to be applied to the fixed electrode film 9 is set at 0V. When the movable mirror is intended to be tilted while bringing the movable mirror close to the fixed electrode film 10, the voltage Va to be applied to the fixed electrode film 10 is set at 0V, and the voltage Va to be applied to the fixed electrode film disposed on the opposite side is set at 5V.

When the applied voltage Va is controlled in this way, the bias voltage Vb comes to −26V (Vb=−26V) in zone B as illustrated at the left (i.e., crossover side) of FIG. 4. Accordingly, a voltage difference DV of 33.5V (DV=33.5V) is generated between the electrode films 8 and 10, and a voltage difference DV of 26V (DV=26V) is generated between the electrode films 7 and 9. As a result, the movable mirror 2 receives an electrostatic force by which the movable mirror 2 is tilted toward left, and the movable electrode film 8 is pressed against the fixed electrode film 10, and is elastically deformed.

When the bias voltage Vb comes to 7.5V (Vb=7.5V) in zone C following zone B, voltage Va to be applied to the address electrode film (i.e., fixed electrode film) 10 is set at 7.5V (Va=7.5V) . As a result, a voltage difference DV of 0V (DV=0) is generated between the electrode films 8 and 10, and a voltage difference DV of 7.5V (DV=7.5V) is generated between the electrode films 7 and 9. Accordingly, an electrostatic force is generated between the electrode films 7 and 9, and a repulsive force generated by the elastic deformation of the movable electrode film 8 in zone B is added to the electrostatic force, so that the movable electrode film 8 is separated from the fixed electrode film 10, and the movable mirror 2 starts being rotated clockwise.

When the bias voltage Vb comes to 24V (Vb=24V) in zone D following zone C, a voltage-difference DV of 16.5V (DV=16.5V) is generated between the electrode films 8 and 10, and a voltage difference DV of 24V (DV=24V) is generated between the electrode films 7 and 9. As a result, the electrostatic force acting between the electrode films 7 and 9 is further increased, and the movable mirror 2 is further rotated clockwise.

In zone E that is the last zone, the movable electrode film 7 of the movable mirror 2 strikes the address electrode film 9. At this time, voltage Va to be applied to the address electrode film 10 is set at 5V (Va=5V) . Because of this collision, the movable mirror 2 slightly vibrates as illustrated in FIG. 5, and reaches a stable state, thus ending its tilt-action performed toward the opposite side.

To bring the movable mirror 2 into the state illustrated at the right (i.e., stay side) of FIG. 4, voltage Va to be applied to the address electrode film (fixed electrode film) 10 is set at 0V (Va=0) as illustrated at the upper part of the right in the frame of FIG. 4 (zone A) . When the bias voltage Vb reaches −26V (Vb=−26V) in zone B following zone A, voltage Va to be applied to the address electrode film (fixed electrode film) 9 disposed on the opposite side is set at 7.5V (Va=7.5V), and the bias voltage Vb is set at 7.5V (Vb=7.5V) in zone C.

In this case, when the movable electrode film 8 is temporarily separated from the fixed electrode film 10, and the bias voltage Vb comes to 24V (Vb=24V) in zone D as illustrated by the dotted round mark H of FIG. 5, the movable electrode film 8 again comes into contact with the fixed electrode film 10. Thereafter, voltage Va to be applied to the fixed electrode film 9 in zone E is set at 5V (Va=5V), and the tilted state of the movable mirror 2 is kept to be tilted toward left. In the above description, the term "contact" is used for convenience of explanation, however, a gap is formed between the movable electrode film and the fixed electrode film, and hence an electric short circuit is never caused between the electrode films. The same applies to a description given below.

According to aforesaid conventional method for driving a microelectromechanical device array, address rewriting (i.e., application of voltage Va) to change the state to the next state is performed after waiting for the end of zone E, i.e., after waiting for the end of the vibration of the movable mirror. The reason is as follows. If address rewriting is performed while the movable mirror is vibrating, e.g., if address rewriting is performed to tilt the movable mirror toward right while the left-tilted movable mirror is vibrating, a vibrating force is added to the electrostatic force added to the movable mirror, so that the movable mirror is immediately tilted toward right in most cases. As a result, light reflection cannot be performed in the left-tilted state, and this will cause a malfunction.

Therefore, according to the conventional method, next-address rewriting (zone A) is performed after waiting for the end of zone E (in the example illustrated in FIG. 5, after a lapse of 22 μs), and hence the microelectromechanical device array has difficulty in operating at high speed.

If address rewriting (zone A) can be performed without malfunction immediately after the start of zone E, the process can proceed to zone B and zone C anytime after the end of the vibration in zone E, and the microelectromechanical device array can operate at high speed. However, there is no conventional technique for ensuring the address rewriting without malfunction.

SUMMARY OF THE INVENTION

It is an object of the invention to provide a microelectromechanical device array capable of operating at high speed and a method for driving the microelectromechanical device array.

(1) A microelectromechanical device array comprising: a device array that includes a plurality of devices arranged at least one of one-dimensionally and two-dimensionally; and a drive circuit, wherein (1) each of the plurality of the devices comprises: a movable portion that is supported to be elastically deformed and that has a movable electrode on at least one part thereof; a fixed electrode that is disposed to face the movable portion and by which the movable portion is moved to one of at least two different positions; and a hold electrode that is provided beside the fixed electrodes, the hold electrode to which applied a hold voltage, the hold voltage that generates the electrostatic force so as to maintain a positional state of the movable portion.

(2) the drive circuit that displaces the movable portion by an electrostatic force between the movable electrode and the fixed electrode, the electrostatic force being generated by writing a displacement signal to one of the movable electrode and the fixed electrode and by applying a control voltage to the other. (2) The microelectromechanical device array as claimed in the item (1), wherein the drive circuit allows the hold voltage to be applied to the hold electrode for being written the displacement signal.

(3) The microelectromechanical device as claimed in the item (1), wherein the drive circuit allows the hold voltage to be constantly applied to the hold electrodes.

(4) A method for driving a microelectromechanical device array, the microelectromechanical device array comprising: a device array that includes a plurality of devices arranged at least one of one-dimensionally and two-dimensionally; and a drive circuit, wherein (1) each of the plurality of the devices comprises: a movable portion that is supported to be elastically deformed and that has a movable electrode on at least one part thereof; and a fixed electrode that is disposed to face the movable portion and by which the movable portion is moved to either of at least two different positions, a hold electrode that is provided beside the fixed electrodes, the hold electrode to which applied a hold voltage, (2) the drive circuit that displaces the movable portion with an electrostatic force between the movable electrode and the fixed electrode, the electrostatic force generated by writing a displacement signal to one of the movable electrode and the fixed electrode and by applying a control voltage to the other, and the method for driving a microelectromechanical device array comprises: an applying the hold voltage generating the electrostatic force to the hold electrode so as to maintain a positional state of the movable portion.

(5) The method for driving a microelectromechanical device as claimed in the item (4), wherein the applying of the hold voltage is performed for being written the displacement signal.

(6) The method for driving a microelectromechanical device array as claimed in the item (4), the applying of the hold voltage is constantly performed.

(7) An image forming apparatus comprising: a light source; a microelectromechanical device array as claimed in the item (1); an optical system that irradiates the microelectromechanical device array with a beam of light emitted from the light source; and a projection optical system that projects a beam of light emitted from the optical system onto an image forming surface.

According to an aspect of the invention, address rewriting can be performed without malfunction even while the movable mirror is vibrating. Therefore, a microelectromechanical device array capable of operating at high speed can be provided.

BRIEF DESCRIPTION OF THE DRAWINGS

The invention disclosed herein will be understood better with reference to the following drawings of which.

DETAILED DESCRIPTION OF THE INVENTION

Exemplary embodiments of the invention will be hereinafter described with reference to the attached drawings.

First Embodiment

Figure 1:
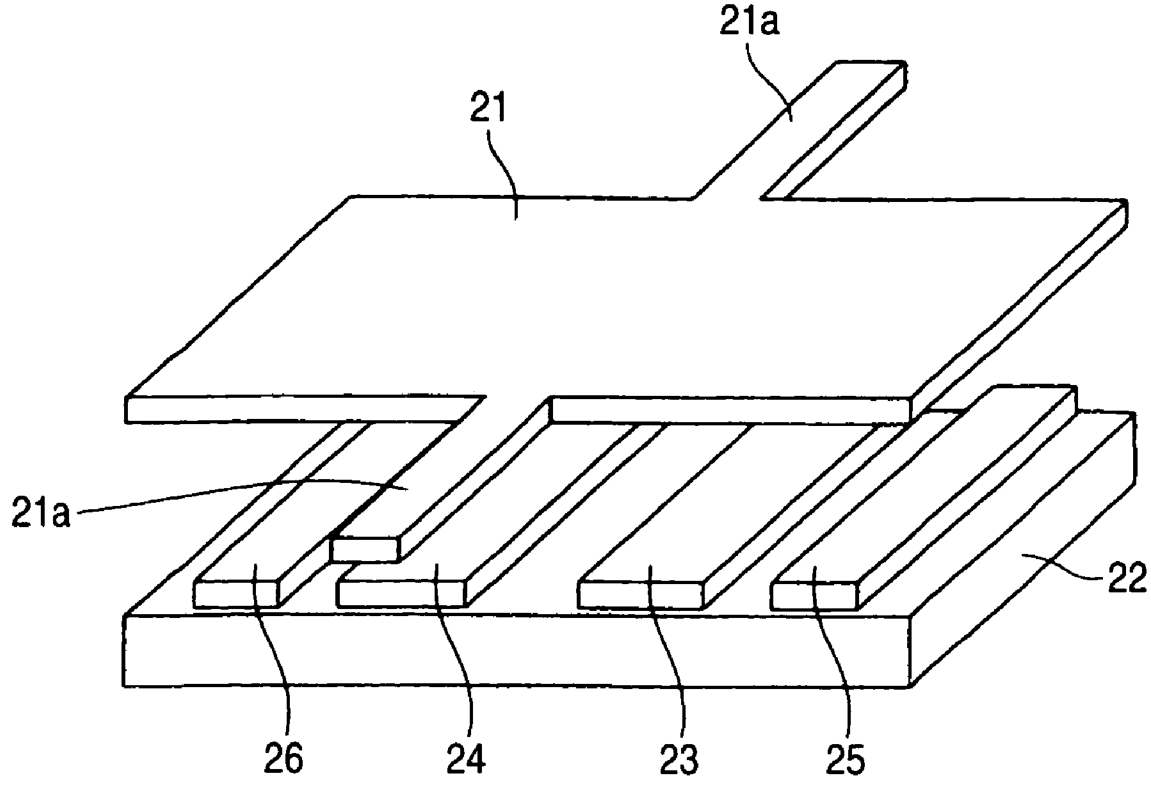
FIG. 1 is a schematic drawing that explains a microelectromechanical device array according to a first embodiment of the invention.

FIG. 1 is a schematic drawing that illustrates one microelectromechanical device drawn from among an array of microelectromechanical devices that constitute a microelectromechanical device array according to a first embodiment of the present invention. movable portion (hereinafter referred to as a "movable mirror") 21 of the microelectromechanical device array in this embodiment is supported in a space by extending a hinge 21*a* between two supporting rods (not shown) formed on the surface of a semiconductor substrate 22, so that the movable mirror 21 can swing. Fixed electrode films (hereinafter referred to as a "Fixed electrode films") 23 and 24 are formed on the surface of the semiconductor substrate 22 facing the back surface of the movable mirror 21.

As illustrated in FIG. 1, the fixed electrode film 23 is formed at the position facing the right part of the back surface of the movable mirror 21 with respect to the hinge 21*a* thereof, whereas the fixed electrode film 24 is formed at the position facing the left part of the back surface of the movable mirror 21 with respect to the hinge 21*a* of the movable mirror 21. In this embodiment, an address voltage Va is applied to the fixed electrode films 23 and 24 as a displacement signal mentioned above, and a bias voltage Vb is applied to a movable electrode (not shown) formed on the back surface of the movable mirror 21 as a control voltage.

The microelectromechanical device array in this embodiment further has hold electrodes (hereinafter referred to as a "hold-electrode films") 25 and 26 disposed on the surface of the semiconductor substrate 22 outside the fixed electrode films 23 and 24, respectively. A hold voltage is applied to the hold electrode films 25 and 26 as described in detail later. Although the hold electrode films 25 and 26 are disposed outside the fixed electrode films 23 and 24, respectively, in this embodiment, the position where the hold electrode films 25 and 26 are disposed together with the fixed electrode films 23 and 24 is not limited to this, and may be fixed at any place on the semiconductor substrate. In this embodiment, the fixed electrode 23 and the hold electrode 25 are positioned to be on one side of the hinge 21*a* which bisects the substrate 22 into symmetrical halves. Further, the fixed electrode 24 and hold electode 26 are on the other side of the hinge 21*a* which bisects the substrate 22 into symmetrical halves.

Figure 3:
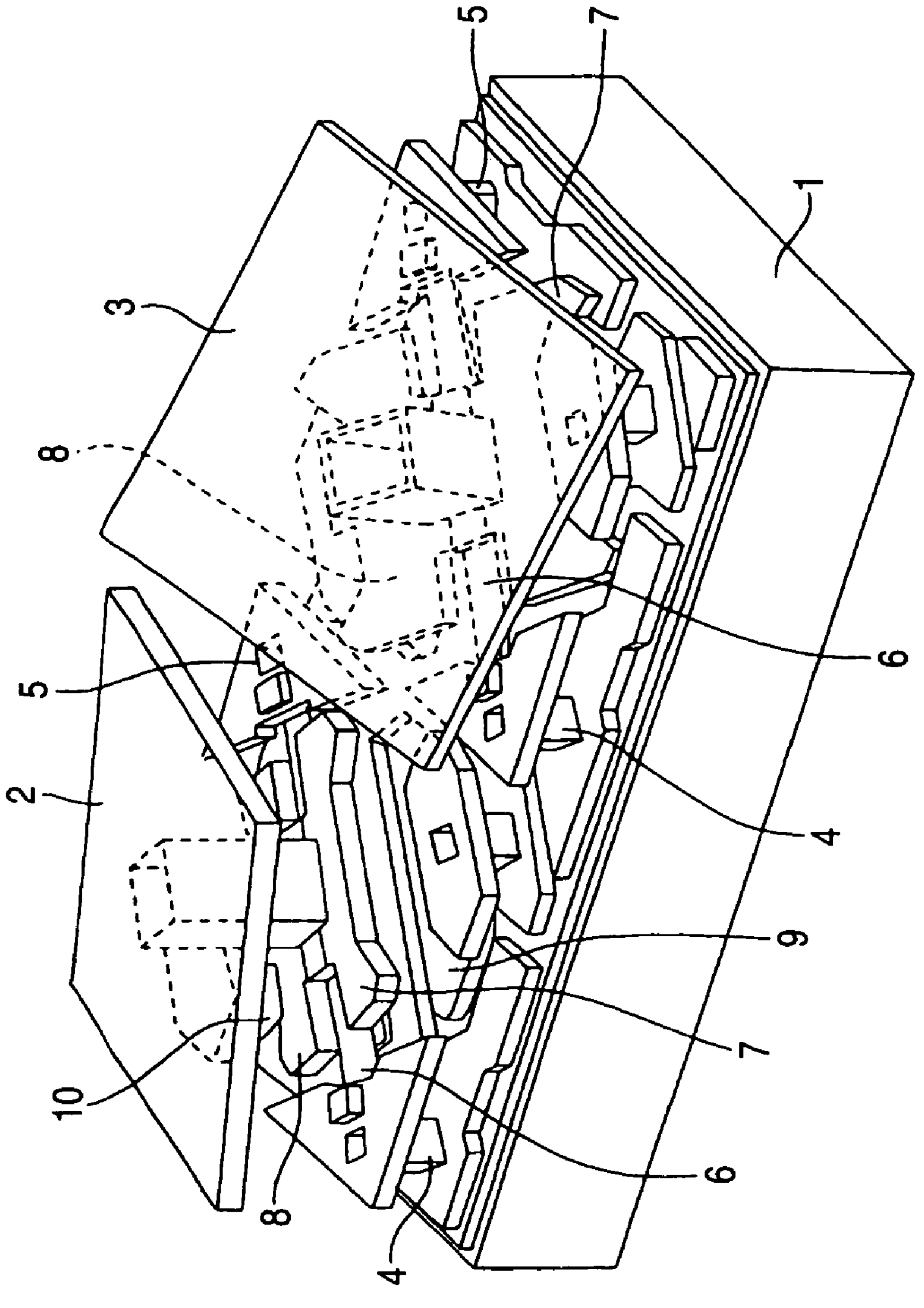
FIG. 3 is a schematic drawing that illustrates two microelectromechanical devices drawn from an array of microelectromechanical devices constituting a microelectromechanical device array, which is generally used.

In the embodiment illustrated in FIG. 1, the movable mirror 21 and the movable electrode are formed integrally with each other, and the hinge 21*a* is projected along the median line of the rectangular movable mirror 21. However, without being changed, this embodiment can be applied to the microelectromechanical device array structured as illustrated in FIG. 3. If so, it is recommended to dispose hold electrode films beside the fixed electrode films 9 and 10, respectively.

In this embodiment, a drive circuit is formed in the semiconductor substrate 22 in the same way as in the above example. According to a command emitted from a control unit (not shown), this drive circuit allows an address voltage Va, a bias voltage Vb, and a hold voltage to be applied to the fixed electrode films 23 and 24, to the movable electrode disposed on the back surface of the movable mirror 21, and to the hold electrode films 25 and 26, respectively.

Figure 2:
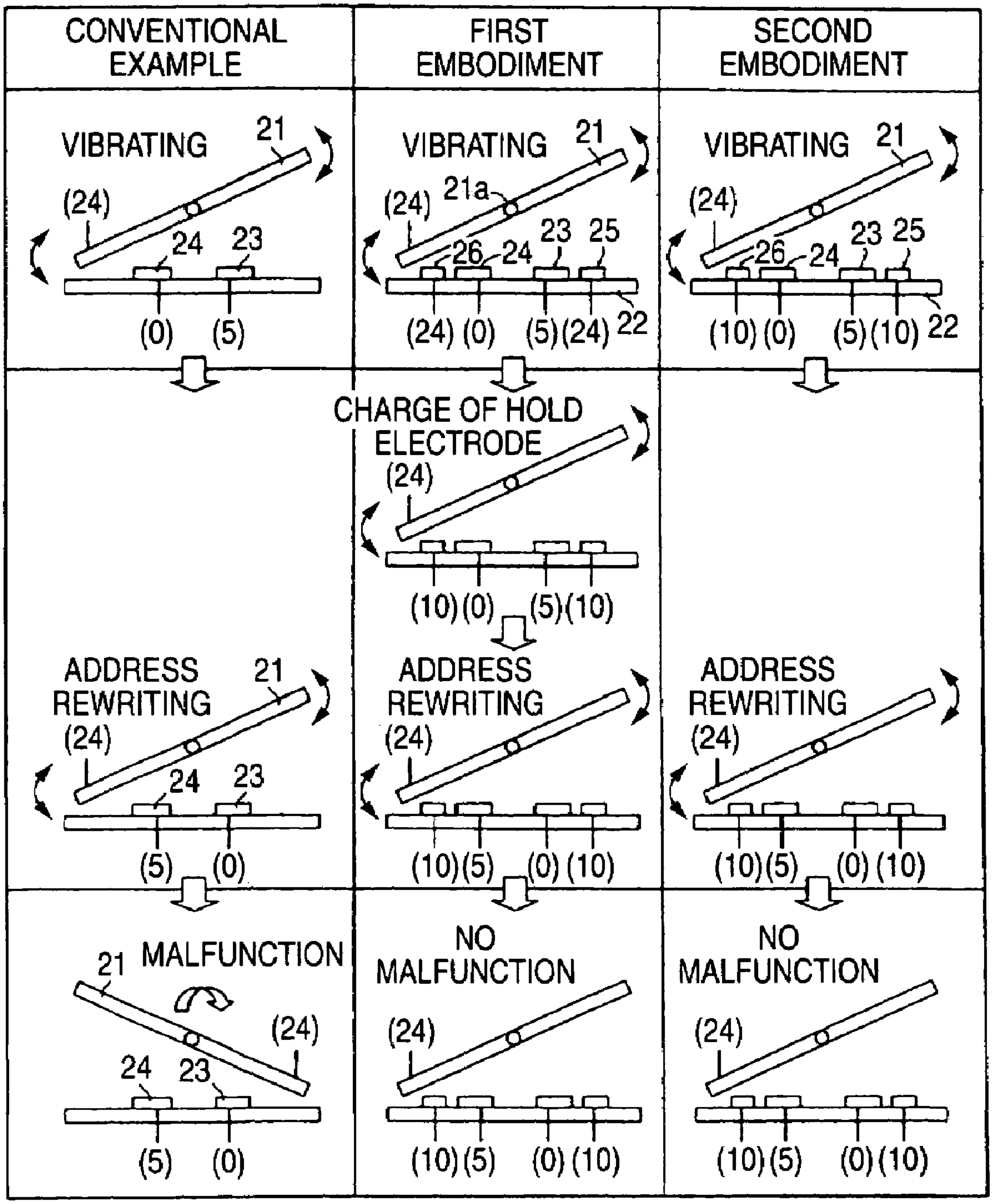
FIG. 2 is a schematic drawing that illustrates the operations of the microelectromechanical device arrays according to the first and second embodiments of the invention and the operation of the conventional microelectromechanical device array.
Figure 4:
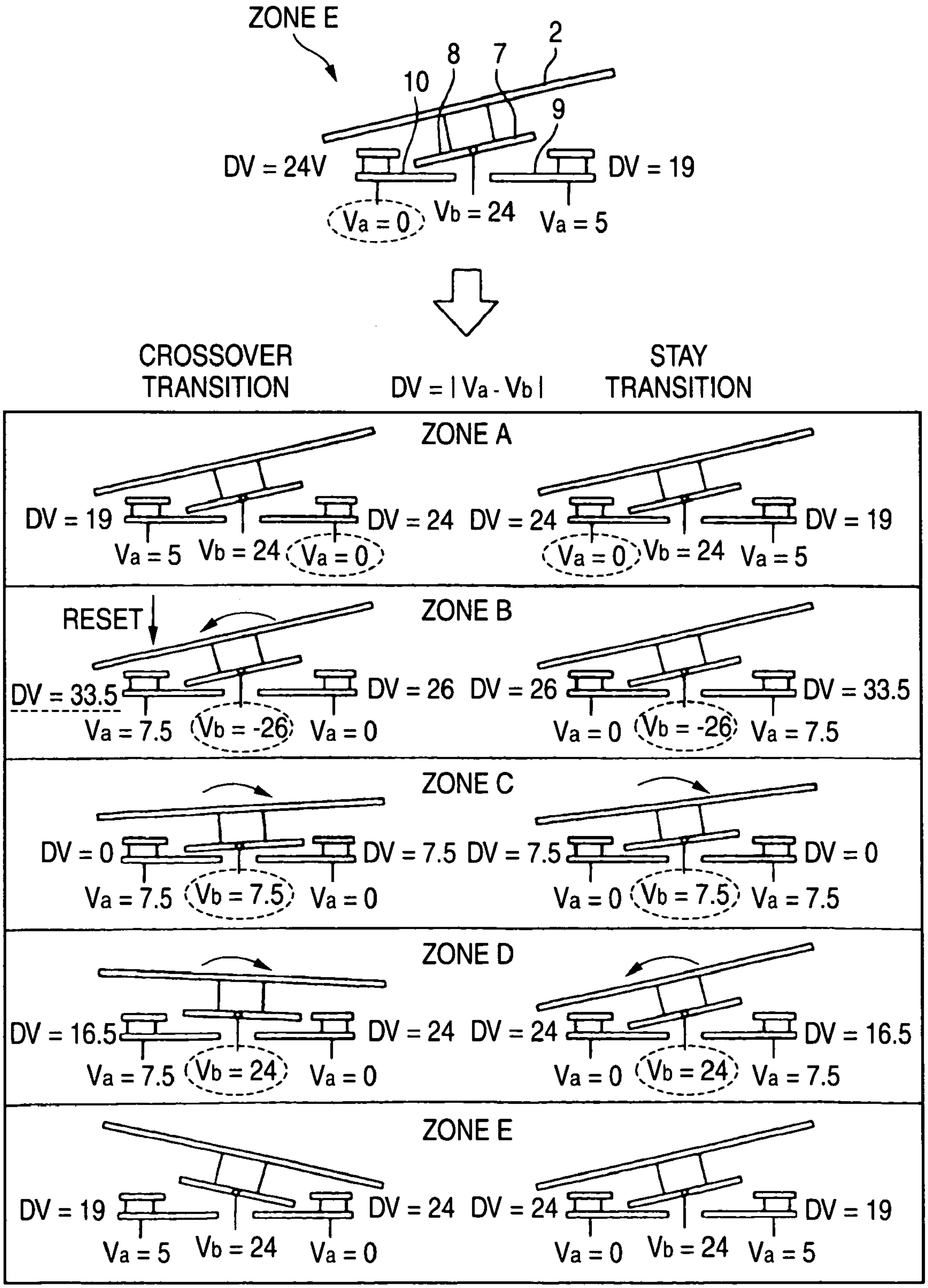
FIG. 4 is an drawing that explains a conventional method for driving the microelectromechanical device array.
Figure 5:
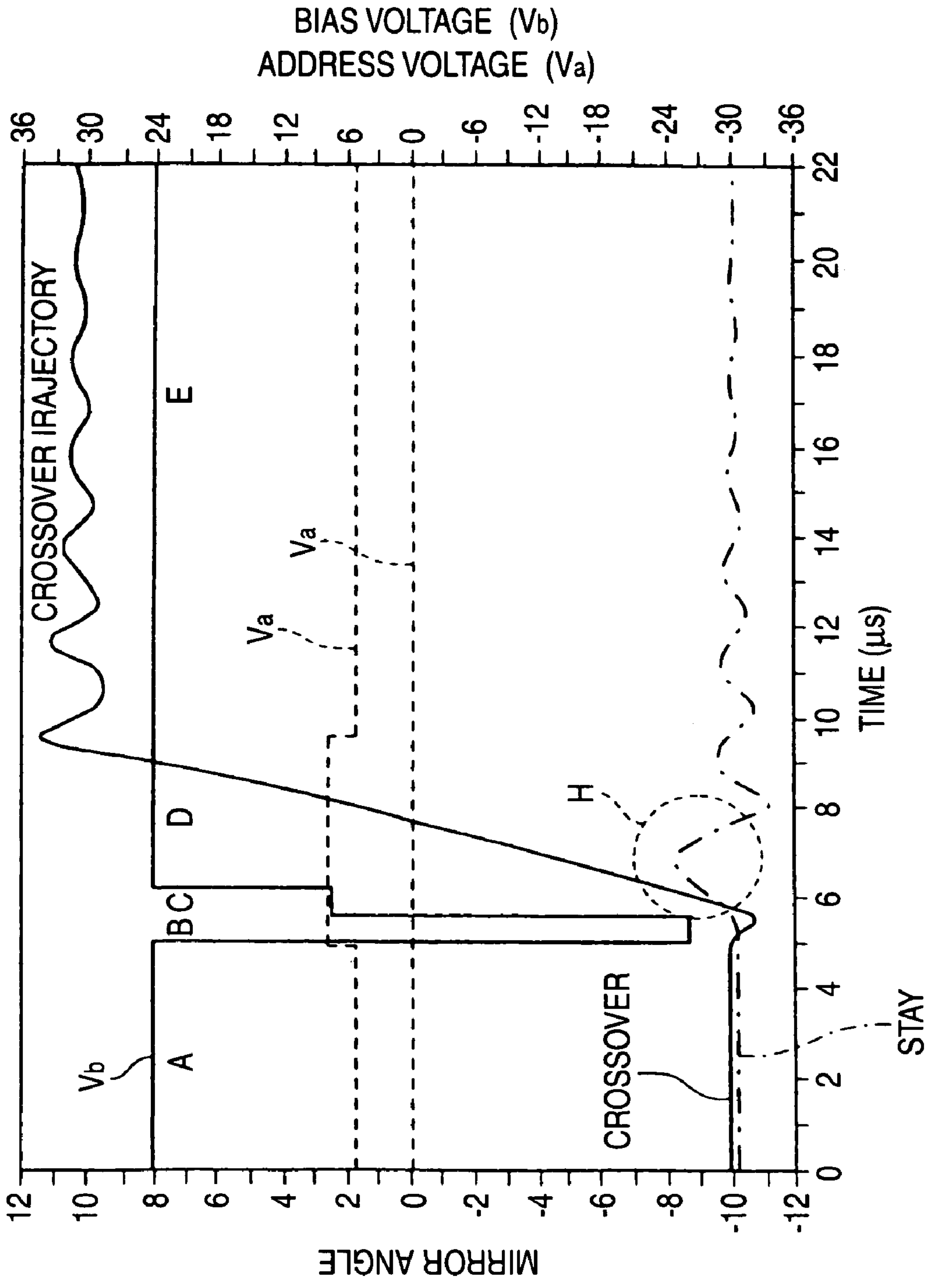
FIG. 5 is a graph that illustrates changes in the address voltage Va, in the bias voltage Vb, and in the displacement angle of the movable mirror in the driving method illustrated in FIG. 4.

The center column of FIG. 2 illustrates the operation of the microelectromechanical device array according to the first embodiment of the invention. Numerals in parentheses designate voltage values applied thereto. A basic method for driving the microelectromechanical device array is carried out according to the description given with reference to FIG. 4 and FIG. 5. However, in this embodiment, the movable-mirror holding control described below is added and performed when the process reaches zone E, i.e., while the movable mirror 21 is vibrating.

When the process reaches zone E, the bias voltage Vb is 24V, the address voltage Va of the fixed electrode film 23 is 5V, and the address voltage Va of the fixed electrode film 24 is 0V. At this time, the same voltage of 24V as the bias voltage Vb is applied to the hold electrode films 25 and 26.

Address rewriting (rewriting of voltage Va) is performed after having reached zone E. In this embodiment, before performing the address rewriting, the hold voltage to be applied to the hold electrode films 25 and 26 is reduced to 10V. As a result, a voltage difference is caused between the hold electrode films 25 and 26 and the movable mirror 21, and an electrostatic force is generated. In FIG. 2, the movable mirror 21 is tilted toward the hold electrode film 26, so that a gap between the hold electrode film 26 and the movable mirror 21 is narrowed. Therefore, the electrostatic attraction force is increased between the hold electrode film 26 and the left part of the movable mirror 21.

In this state, the address rewriting is performed. In more detail, the voltage Va to be applied to the fixed electrode film 24 is changed from 0V to 5V, and, at the same time, the voltage Va to be applied to the fixed electrode film 23 is changed from 5V to 0V.

In this embodiment, the hold voltage of 10V is applied to the hold electrode films 25 and 26 even when the address voltage Va is changed in this way. Therefore, the left-tilted state of the movable mirror 21 is stably maintained, and no malfunction is caused.

For comparison, a conventional example in which no hold electrode is provided will be described with reference to the left column in FIG. 2. When the left end of the movable mirror 21 strikes the substrate 22 by tilting the movable mirror 21 toward left, the movable mirror 21 vibrates. In this state, the voltage Vb applied to the movable mirror 21 is 24V, the address voltage Va of the fixed electrode film 24 disposed on the left side is 0V, and the address voltage Va of the fixed electrode film 23 disposed on the right side is 5V.

In other words, a voltage difference between the left part of the movable mirror 21 and the fixed electrode film 24 is 24V, and a voltage difference between the right part of the movable mirror 21 and the fixed electrode film 23 is 19V. Therefore, an electrostatic attraction force between the fixed electrode film 24 disposed on the left side and the movable mirror 21 is greater than an electrostatic attraction force between the fixed electrode film 23 disposed on the right side and the movable mirror 21.

If address rewriting is performed in this state, a voltage difference between the left part of the movable mirror 21 and the fixed electrode film 24 comes to 19V, and a voltage difference between the right part of the movable mirror 21 and the fixed electrode film 23 comes to 24V. However, if the movable mirror 21 is in the left-tilted state, an electrostatic attraction force between the movable mirror 21 and the fixed electrode film 24 is greater, and the left-tilted state is maintained, because the gap between the movable mirror 21 and the fixed electrode film 24 is narrower.

However, if the movable mirror 21 vibrates to have a great vibration amplitude so that the gap between the left part of the movable mirror 21 and the fixed electrode film 24 is widened, the electrostatic attraction force between the right part of the movable mirror 21 and the fixed electrode film 23 will surpass the electrostatic attraction force between the left part of the movable mirror 21 and the fixed electrode film 24, and the movable mirror 21 will be tilted rightwardly. This causes a malfunction.

Since the hold electrode films 25 and 26 are not provided in the conventional device array as described above, a malfunction will be caused if address rewriting is performed while the movable mirror 21 is vibrating. In contrast, in this embodiment, positional state of the movable mirror 21, that is, the tilted state of the movable mirror 21 is maintained by applying a hold voltage to the hold electrode films 25 and 26, and hence address rewriting can be performed even while the movable mirror 21 is vibrating, and the microelectromechanical device array can operate at high speed correspondingly thereto.

Second Embodiment

The right column in FIG. 2 illustrates a method for driving a microelectromechanical device array according to a second embodiment of the invention. In the first embodiment mentioned above, the bias voltage Vb is 24V when the process reaches zone E. At this time, the same voltage of 24V as the bias voltage Vb is applied to the hold electrode films 25 and 26. Thereafter, the hold voltage to be applied to the hold electrode films 25 and 26 is reduced to 10V before performing address rewriting (i.e., the rewriting of the voltage Va).

On the other hand, in this embodiment, a hold voltage of 10V is always applied to the hold electrode films 25 and 26 without changing the hold voltage to be applied to the hold electrode films 25 and 26. According to this method, there is no fear that the movable mirror 21 will cause a malfunction even when address rewriting is performed while the movable mirror 21 is vibrating as in the first embodiment.

In each embodiment mentioned above, the same bias voltage Vb is applied to the movable electrode films 7 and 8 disposed on the side of the movable mirror, and the different address voltages Va, each of which is a displacement signal, are applied to the fixed electrode films 9 and 10, respectively. Contrary to this, an address voltage may be applied to the movable electrode films 7 and 8, and a common bias voltage may be applied to the fixed electrode films 9 and 10. Additionally, the hold voltage may be 0V. Still additionally, the hold electrode may be used as a floating one when a hold voltage is not applied.

The microelectromechanical device array mentioned above can be used in an image forming apparatus, such as an optical printer or an image projecting apparatus. In this case, the image forming apparatus is made up of a light source, the microelectromechanical device array described in the first or second embodiment, an optical system that irradiates the microelectromechanical device array with a beam of light emitted from the light source, and a projection optical system that projects a beam of light emitted from the optical system onto an image forming surface.

The microelectromechanical device array according to the invention can perform an address-voltage rewriting process without malfunction even while the movable mirror is vibrating, and hence is useful as a microelectromechanical device array having high-speed drivability.

The present application claims foreign priority based on Japanese Patent Application (JP 2005-169868) filed Jun. 9 of 2005, the subject matter of which is hereby incorporated herein by reference.

What is claimed is:

1. A microelectromechanical device array comprising:

a device array that includes a plurality of devices arranged at least one of one-dimensionally and two-dimensionally; and a drive circuit, wherein (1) each of the plurality of the devices comprises:

a movable portion that is supported to be elastically deformed and that has a movable electrode on at least one part thereof;

a fixed electrode that is disposed to face the movable portion and by which the movable portion is moved to one of at least two different positions; and a hold electrode that is provided beside the fixed electrode, wherein a hold voltage is applied to the hold electrode, and the hold voltage generates a first electrostatic force to maintain a positional state of the movable portion, and (2) the drive circuit that displaces the movable portion by a second electrostatic force between the movable electrode and the fixed electrode, wherein the second electrostatic force is generated by writing a displacement signal to one of the movable electrode and the fixed electrode and by applying a control voltage to the other of the movable electrode and the fixed electrode.

2. The microelectromechanical device array as claimed in claim 1, wherein the drive circuit allows the hold voltage to be applied to the hold electrode for writing the displacement signal.

3. The microelectromechanical device as claimed in claim 1, wherein the drive circuit allows the hold voltage to be constantly applied to the hold electrode.

4. A method for driving a microelectromechanical device array, the microelectromechanical device array comprising: a device array that includes a plurality of devices arranged at least one of one-dimensionally and two-dimensionally; and a drive circuit, wherein (1) each of the plurality of the devices comprises: a movable portion that is supported to be elastically deformed and that has a movable electrode on at least one part thereof; a fixed electrode that is disposed to face the movable portion and by which the movable portion is moved to either of at least two different positions; and a hold electrode that is provided beside the fixed electrode, wherein a hold voltage is applied the hold electrode, and (2) the drive circuit that displaces the movable portion with a first electrostatic force between the movable electrode and the fixed electrode, wherein the first electrostatic force is generated by writing a displacement signal to one of the movable electrode and the fixed electrode and by applying a control voltage to the other one of the movable electrode and the fixed electrode, wherein the method for driving a microelectromechanical device array comprises: applying the hold voltage generating a second electrostatic force to the hold electrode so as to maintain a positional state of the movable portion.

5. The method for driving a microelectromechanical device as claimed in claim 4, wherein the applying of the hold voltage is performed for writing the displacement signal.

6. The method for driving a microelectromechanical device array as claimed in claim 4, the applying of the hold voltage is constantly performed.

7. An image forming apparatus comprising: a light source; a microelectromechanical device array as claimed in claim 1; an optical system that irradiates the microelectromechanical device array with a beam of light emitted from the light source; and a projection optical system that projects the beam of light emitted from the optical system onto an image forming surface.

8. The microelectromechanical device array as claimed in claim 1, wherein the hold electrode and the fixed electrode are disposed on a substrate, and wherein the hold electrode and the fixed electrode are further disposed on one side of a center line which bisects the substrate into two symmetric halves.

9. The method for driving a microelectromechanical device array as claimed in claim 4, wherein the hold electrode and the fixed electrode are disposed on a substrate, and wherein the hold electrode and the fixed electrode are further disposed on one side of a center line which bisects the substrate into two symmetric halves.

10. The microelectromechanical device array as claimed in claim 1, wherein the hold electrode comprises:

a first hold electrode, and a second hold electrode; and wherein the fixed electrode comprises:

a first fixed electrode, and a second fixed electrode.

11. The method for driving a microelectromechanical device array as claimed in claim 4, wherein the hold electrode comprises:

a first hold electrode, and a second hold electrode; and wherein the fixed electrode comprises:

a first fixed electrode, and a second fixed electrode.

* * * * *